United States Patent [19]

Fletcher et al.

[11] 3,808,517

[45] Apr. 30, 1974

[54] LOW DISTORTION AUTOMATIC PHASE CONTROL CIRCUIT

[76] Inventors: James C. Fletcher, Administrator of the National Aeronautics and Space Administration with respect to an invention of; Geir Hauge, 4409 S. Lowell, Denver, Colo. 80236; Christ W. Pederson, 3798 W. Chenango Ave., Littleton, Colo. 80120

[22] Filed: Feb. 5, 1973

[21] Appl. No.: 329,958

[52] U.S. Cl. .................. 323/106, 323/122, 323/128

[51] Int. Cl. .............................................. H03h 7/20

[58] Field of Search ............ 307/320; 323/101, 106, 323/108, 122, 128; 328/155

[56] References Cited

UNITED STATES PATENTS 3,196,368 7/1965 Potter ............................ 323/128 X 3,356,865 12/1967 Woster ............................ 328/155 X 3,614,475 10/1971 Deboo ............................ 328/155 X 3,628,162 12/1971 Lunden et al ....................... 328/155

*Primary Examiner*—A. D. Pellinen

*Attorney, Agent, or Firm*—L. D. Wofford, Jr.; G. J. Porter; J. R. Manning

[57] ABSTRACT

A voltage controlled phase shifter is rendered substantially harmonic distortion free over a large dynamic input range by employing two oppositely poled, equally biased varactor diodes as the voltage controlled elements which adjust the phase shift. Control voltages which affect the bias of both diodes equally are used to adjust the phase shift without increasing distortion. A feedback stabilized phase shifter is rendered substantially frequency independent by employing a phase detector to control the phase shift of the voltage controlled phase shifter.

7 Claims, 3 Drawing Figures

LOW DISTORTION AUTOMATIC PHASE CONTROL CIRCUIT

BACKGROUND OF THE INVENTION

This invention relates to the field of phase shifters and more particularly to the fields of voltage controlled phase shifters and feedback stabilized phase shifters.

Prior art phase control systems for voltage controlled phase shifters have employed voltage variable impedances to control the phase shift introduced by the phase shifter. Variable capacitances (varactor diodes) and resistances (varistors and field effect transistors) have both been employed. However, these prior art systems suffer from non-linearity, distortion and frequency dependence problems. The present invention has overcome these prior art problems, as will become clear hereinafter.

SUMMARY OF THE INVENTION

The voltage controlled phase shifter of this invention employs an operational amplifier having both inverting and non-inverting inputs. The input signal which is to be phase shifted is coupled to both amplifier inputs by separate resistors. The amplifier gain is preferably stabilized at unity gain by feeding its output back to the inverting input. A voltage variable capacitor network is connected to the non-inverting amplifier input to control the phase shift introduced by the phase shifter. The voltage variable capacitor network employs first and second oppositely poled varactor diodes coupled to the amplifier's non-inverting input by an isolation network which isolates the amplifier from the varactor diode bias voltages. Bias voltages and control voltages are coupled to the varactors to maintain equal operating points for the varactors.

In the preferred embodiment the isolation network comprises first and second capacitors respectively in series with the first and second varactor diodes which are isolated from each other. Equal but opposite polarity voltage sources are connected to the varactors to establish their operating points. Equal but opposite control voltages are coupled to the diodes to adjust their operating points to change their capacitance.

In an alternative embodiment the varactors are connected in series, with a single capacitor coupling their junction to the amplifier. In this embodiment a bias supply is connected to one end of the series diode string and the control voltage is connected to the other end of the string.

A feedback stabilized frequency independent phase shifter is achieved by employing a phase detector to generate the control voltage(s) for the voltage controlled phase shifter in accordance with the difference between desired and actual phase shift introduced by the phase shifter.

If large phase shift variations are desired with a high control loop gain, a number of the phase shifters may be connected in series and controlled by a single phase detector.

DETAILED DESCRIPTION OF THE PREFERRED EMBODIMENT

Figure 1:
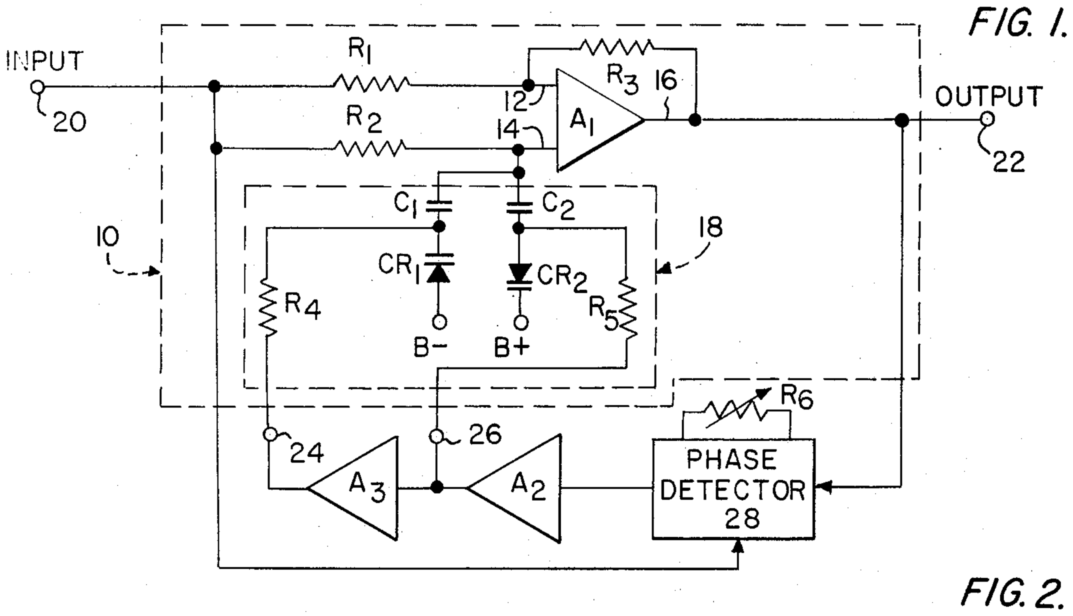
FIG. 1 is a circuit diagram of the preferred embodiment of the voltage controlled phase shifter incorporated in a feedback stabilized phase shifter.

The preferred embodiment of the voltage controlled phase shifter is within the dashed line 10 in FIG. 1. $A_1$ is the phase shifting operational amplifier. The input terminal 20 is connected directly to the inverting input 12 of amplifier $A_1$ by a first resistor $R_1$ and to the non-inverting amplifier input 14 by a second resistor $R_2$.

The amplifier output 16 is connected to inverting amplifier input 12 by a third resistor $R_3$ which establishes the gain of amplifier $A_1$. Preferably $R_3 = R_1$, thereby establishing a gain of unity independent of the input frequency.

A voltage controlled capacitor network 18 having a capacitance of $C_t$ is connected to non-inverting amplifier input 14. $C_t$ and $R_2$ together establish the phase shift introduced by the phase shifter. For $R_1 = R_3$, the phase lag is given by the expression:

$$\theta_{lag} = -2 \tan^{-1} WC_tR_2$$

Capacitor network 18 is comprised of first and second varactor diodes $CR_1$ and $CR_2$ respectively and an isolation network comprised of first and second capacitors $C_1$ and $C_2$ respectively. The isolation network prevents the varactor diode bias voltages from affecting amplifier $A_1$. In this preferred embodiment capacitor $C_1$ and varactor diode $CR_1$ are connected in series as are capacitor $C_2$ and varactor diode $CR_2$. The varactor diodes are oppositely poled with respect to the amplifier input, that is one diode ($CR_1$) has its cathode coupled to the amplifier input by $C_1$ while the other diode ($CR_2$) has its anode coupled to the amplifier input by $C_2$. The anode of $CR_1$ is connected to a negative bias voltage supply $B^-$ and the cathode of $CR_2$ is connected to a positive voltage source $B^+$. A first control terminal 24 is connected to the junction of $C_1$ and $CR_1$ by a resistor $R_4$ and a second control terminal 26 is connected to the junction of $C_2$ and $CR_2$ by a resistor $R_5$. Resistors $R_4$ and $R_5$ prevent a control source of low output impedance from providing a signal ground at the capacitor/-varactor junctions which would prevent proper operation of the phase shifter.

With equal positive and negative bias voltage supplies and equal but opposite polarity control voltages applied to the control terminals, the varactors are biased to the same operating point. For matched varactors, this results in equal capacitances and symmetric operation even with large input signals. This results in low harmonic distortion in the phase shifter output. Operation with 6 volt peak-to-peak input and output signals with harmonic distortion down better than 70db has been achieved with this circuit.

The preferred embodiment of a feedback stabilized phase shifter is obtained by adding a phase detector 28 and feedback amplifiers to the voltage controlled phase shifter 10. The phase detector is connected between the input and output terminals 20 and 22 to compare the actual phase shift with the desired phase shift — a value to which the phase detector is preset by adjustment of $R_6$ to insert a d.c. offset current. The phase detector output is connected to a control means comprising an amplifier $A_2$ which amplifies the phase detector output to the degree necessary to control the varactors with the desired loop gain. The output of control amplifier $A_2$ is connected directly to control terminal 26 of the phase shifter and is inverted by a unity gain inverting amplifier $A_3$ and applied to control terminal 24. This provides the necessary equal and opposite control voltages for the voltage controlled phase shifter 10. Since the control voltages control the value of the total capacitance $C_t$ of network 18, the feedback system controls the value of $C_t$ to stabilize the phase shift with respect to frequency.

For maximum versatility an adjustable phase detector is preferably employed. This adjustability may be obtained by adding a d.c. offset current to the phase detector output.

In operation, the voltage controlled phase shifter produces a phase shift in accordance with the input frequency and the value of $C_t$. Decreasing the varactor back bias increases its capacitance and the capacitance $C_t$. Increasing $C_t$ increases the term $WC_tR_2$ which in accordance with the expression $\theta_{lag} = -2 \tan^{-1} WC_tR_2$ increases the phase lag at a given frequency. The phase lag approaches 0° when $WC_tR_2$ approaches zero and approaches −180° as $WC_tR_2$ becomes large. Thus the phase shift is readily controlled by the control voltages.

In operation of the feedback stabilized phase shifter, the signal to be phase shifted is applied to the input. This results in an output signal which is applied to the phase detector. The phase detector produces a d.c. output which is used to adjust the operating point of the varactor diodes in order to obtain the value of capacitance $C_t$ which produces the pre-selected phase shift. Thus if capacitance $C_t$ is too small initially, the feedback voltage will decrease the back bias across each varactor to increase its capacitance and that of $C_t$. Similarly, if $C_t$ is too large, the back bias across the varactors is increased.

This control system maintains the phase shift substantially constant for frequency variations in the vicinity of the design frequency.

The phase shift introduced by the feedback phase shifter may be adjusted by adding a d.c. offset current to the phase detector output. The offset current is amplified by $A_2$ and applied to the varactor diodes as a change in the control voltage. This changes the bias on the varactors and their capacitance. The capacitance change changes the phase shift introduced by amplifier $A_1$. This changes the relative phases between the inputs to the phase detector in a direction which changes the phase detector output to null out the offset current. The amount by which the phase shift can be changed in this way is limited by the loop gain, since with a high gain amplifier $A_2$, an inserted current which produces only a few degrees of phase shift variation may saturate the amplifier, while a low gain amplifier will not saturate as soon.

If a positive phase shift rather than a negative one is required, the output 22 of the phase shifter may drive an inverting amplifier which adds 180° to the phase shift.

If it is desired to have a voltage controlled phase shifter which requires only one control voltage, the amplifier $A_3$ can be incorporated into the phase shifter and the node 26 may be made the control terminal.

Figure 2:
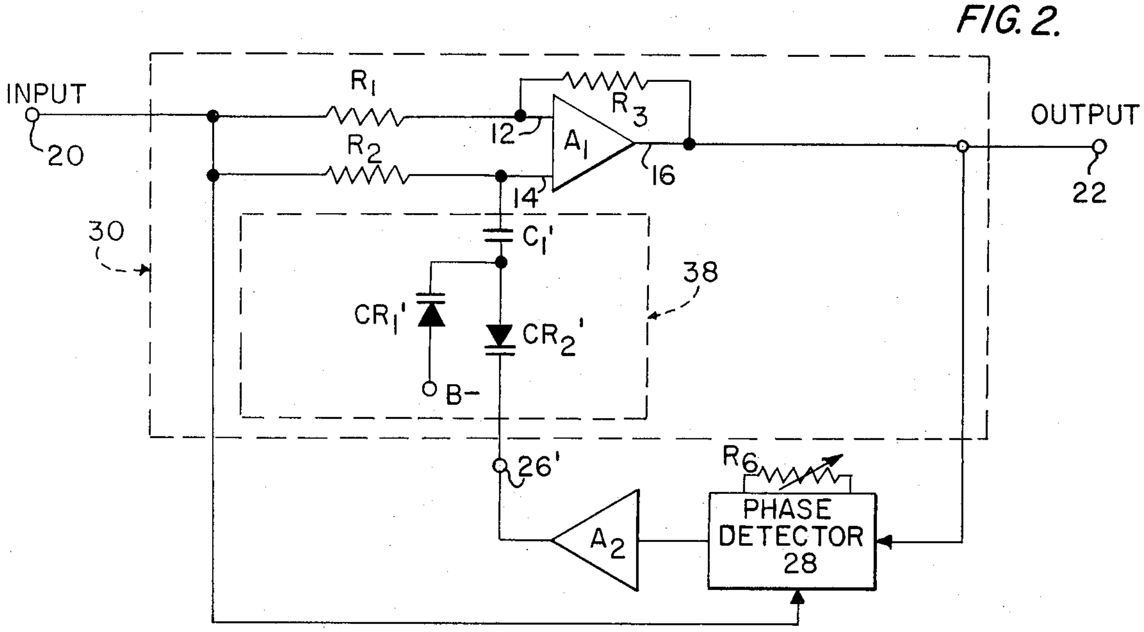
FIG. 2 is a circuit diagram of an alternative embodiment of the voltage controlled phase shifter incorporated in a feedback stabilized phase shifter.

FIG. 2 shows an alternative voltage controlled phase shifter circuit 30 which also obtains most of the invention's benefits with only a single control voltage. In circuit 30, only the capacitor network 38 differs from the capacitor network 18 in circuit 10. In circuit 38 varactor diodes $CR'_1$ and $CR'_2$ are connected in series and have their junction connected to amplifier input 14 by a single isolation capacitor $C'_1$. The anode of $CR'_1$ is connected to a negative bias voltage and the cathode of $CR'_2$ is connected to the single control terminal 26'. This circuit is not the preferred embodiment because the back bias on varactor diodes $CR'_1$ and $CR'_2$ is dependent on their d.c. operating characteristics and their back bias will be equal only when they are perfectly matched. However, with well matched varactor diodes this circuit provides a usable low distortion voltage controlled phase shift.

A feedback stabilized phase shifter is obtained from the voltage controlled phase shifter 30 by connecting the input and output to a phase detector and using the phase detector's output as the control signal.

The operation of the alternative embodiment is similar to that of the preferred embodiment, except that the back bias of the varactors is dependent on the individual back biases which produce a given reverse current, since the same reverse current flows through each diode. The voltage across the diodes is fixed by the bias voltage supply and the control voltage. The varactors therefore operate at back biases which add to the sum of the bias and control voltages and which are achieved with the same reverse current. Thus, mis-matched diodes will operate at different back biases, whose difference will increase with increasing mis-match.

Figure 3:
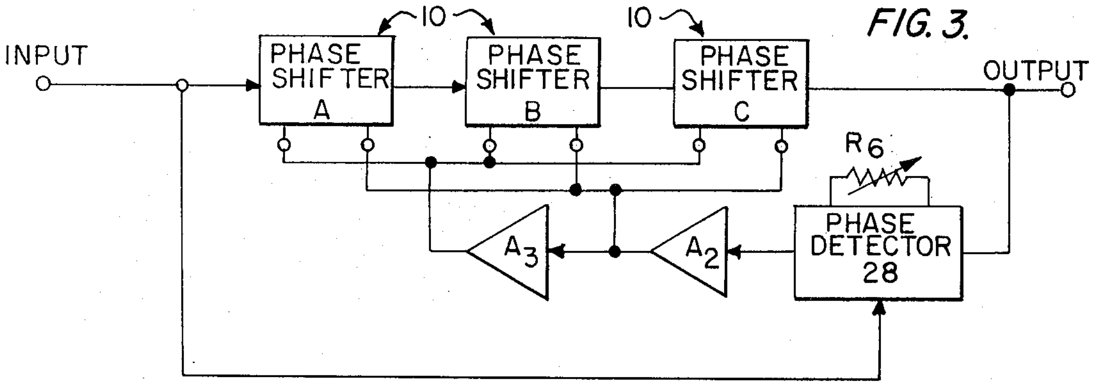
FIG. 3 shows a feedback stabilized phase shifter employing a plurality of the preferred voltage controlled phase shifters.

A large phase shift variation may be obtained from the feedback controlled phase shifter of FIG. 3. Three voltage controlled phase shifters 10 (A, B and C) are employed along with phase detector 28 and amplifiers $A_2$ and $A_3$. The only difference between this circuit and that of FIG. 1 is that three voltage controlled phase shifters are connected in series between the input and output. The overall phase shift is detected by phase detector 28. The output of amplifiers $A_2$ and $A_3$ are connected to each of the phase shifters. In operation, each of the phase shifters 10 produces approximately the same phase shift. And the overall phase shift is the sum of the individual phase shifts. Thus if a total phase shift of 90° is desired, each phase shifter yields a phase shift of 30°, while if a total phase shift of 180° is desired each phase shifter yeilds a shift of 60°. This circuit allows greater phase shifts for a given control gain without saturating amplifiers $A_2$ and $A_3$. This system has held the phase shift of the phase shifter to 0.1° of selected phase lags between 0° and 180° despite frequency variations of 10 percent of the design frequency.

While the preferred embodiment has been described in terms of specific voltage relationships, such as equal but opposite polarity bias and control voltages, it is to be understood that the important feature is the equal operating points of the varactors. Other more complicated systems may be employed to produce these equal operating points; however, the simple systems described are adequate.

What is claimed is:

1. A voltage controlled phase shifter comprising:

an amplifier having an inverting input and a non-inverting input;

an input terminal connected to the inverting input of the amplifier by a first resistor;

a second resistor connecting the input terminal to the non-inverting input of the amplifier;

a capacitor network connected between the non-inverting input and signal ground;

said capacitor network comprising first and second varactor diodes and an isolation means, said isolation means being connected between the amplifier's non-inverting input and the varactor diodes to isolate the amplifier from the varactor diodes' bias voltages, said varactor diodes being poled oppositely with respect to the amplifier's non-inverting input, and;

bias voltage supply means connected to the varactor diodes to bias them to the same d.c. operating point and control terminal means connected to the varactor diodes for adjusting their bias.

2. The phase shifter of claim 1 wherein the amplifier has a gain of substantially unity.

3. The phase shifter of claim 1 wherein:

the isolation means comprises first and second capacitors in series with the first and second varactor diodes, respectively;

the bias voltage supply means comprises first and second bias voltage supplies of equal magnitude and opposite polarities connected respectively to the first and second varactor diodes to back bias both varactor diodes to the same d.c. operating point, and;

the control terminal means comprises first and second terminals connected respectively to the first and second varactor diodes at their ends remote from the bias voltage supply connections whereby varying the voltages on the control terminals varies the bias on the varactor diodes.

4. The phase shifter of claim 1 wherein:

the first and second varactor diodes are connected in a series string with the anode of one connected to the cathode of the other;

the isolation means comprises a capacitor connected between the amplifier's non-inverting input and the connection joining the two diodes;

the bias voltage supply means comprises a bias voltage supply connected to one end of the series varactor diode string, and;

the control terminal means comprises a terminal connected to the other end of the series varactor diode string.

5. A feedback stabilized phase shifter comprising:

the voltage controlled phase shifter of claim 1;

phase detector means connected between the input and output terminals and providing a phase detector output signal representative of any difference between the actual phase shifter input-to-output phase shift and the desired phase shifter input-to-output phase shift, and;

control means coupling the phase detector output signal to the control terminal means to adjust the varactor bias to reduce any phase error detected by the phase detector.

6. A feedback stabilized phase shifter comprising:

the voltage controlled phase shifter of claim 3;

phase detector means connected between the input and output terminals and providing an output signal representative of any difference between the actual phase shifter input-to-output phase shift and the desired phase shifter input-to-output phase shift;

control means coupling the output of the phase detector to the first control terminal;

inverting amplifier means connected between the output of the control means and the second control terminal, whereby equal and opposite control voltages are applied to the control terminals.

7. A feedback stabilized phase shifter comprising:

the voltage controlled phase shifter of claim 4;

phase detector means connected between the input and output terminals and providing an output signal representative of any difference between the actual phase shifter input-to-output phase shift and the desired phase shifter input-to-output phase shift;

control means coupling the phase detector output to the control terminal to couple the phase detector output signal to the control terminal, whereby the varactor diodes' bias is adjusted in accordance with the phase detector output signal.

* * * * *